(12) United States Patent
Little et al.

(10) Patent No.: US 11,024,099 B1
(45) Date of Patent: Jun. 1, 2021

(54) METHOD AND SYSTEM FOR CURATING A VIRTUAL MODEL FOR FEATURE IDENTIFICATION

(71) Applicant: STATE FARM MUTUAL AUTOMOBILE INSURANCE COMPANY, Bloomington, IL (US)

(72) Inventors: Rebecca A. Little, Gilbert, AZ (US); Bryan R. Nussbaum, Bloomington, IL (US); Deanna L. Stockweather, Normal, IL (US); Nathan C. Summers, Mesa, AZ (US); An Ho, Phoenix, AZ (US); Vicki King, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 5 days.

(21) Appl. No.: 16/163,099

(22) Filed: Oct. 17, 2018

(51) Int. Cl.
*G06T 19/20* (2011.01)
*G06T 17/05* (2011.01)
(Continued)

(52) U.S. Cl.
CPC ............ *G06T 19/20* (2013.01); *G06K 9/6202* (2013.01); *G06Q 50/163* (2013.01); *G06T 17/05* (2013.01);
(Continued)

(58) Field of Classification Search
CPC ....... G06T 19/20; G06T 17/05; G06K 9/6202; G06Q 50/163
(Continued)

(56) References Cited

U.S. PATENT DOCUMENTS 6,836,270 B2 * 12/2004 Du .................. G06T 17/05
345/419
8,718,612 B2  5/2014 Calman et al.
(Continued)

FOREIGN PATENT DOCUMENTS

| EP | 0930755 A1 | 7/1999 |
|---|---|---|
| WO | WO-2016/040376 A1 | 3/2016 |
| WO | WO-2016/148753 A1 | 9/2016 |

OTHER PUBLICATIONS

Office Action for U.S. Appl. No. 16/242,206, dated Jan. 27, 2020, Little, "Virtual Environment Generation for Collaborative Building Assessment", 9 pages.
(Continued)

*Primary Examiner* — Hai Tao Sun
(74) *Attorney, Agent, or Firm* — Lee & Hayes, P.C.

(57) ABSTRACT

Computer-implemented methods and systems for curating virtual models and populating overlays within a virtual environment are described herein. A server may receive a data request from a user electronic device. The data request may comprise a property of interest located at a particular portion of an overall region. The server may then dynamically acquire a virtual model for rendering the property within a virtual environment at the user electronic device based on the data request. The server may then curate the virtual model in accordance with rules that emphasize features associated with the property that are relevant to assessing risks associated with the property when assessing the property. The server may then identify the curated property modeled by the virtual model, obtain annotation records associated with the features of the property, and populate an annotations overlay rendered in the virtual environment with information included in the annotation records.

17 Claims, 7 Drawing Sheets

(51) Int. Cl.
*G06K 9/62* (2006.01)
*G06Q 50/16* (2012.01)

(52) U.S. Cl.
CPC .... *G06T 2200/24* (2013.01); *G06T 2219/004* (2013.01); *G06T 2219/2016* (2013.01)

(58) Field of Classification Search
USPC ......................................................... 345/419
See application file for complete search history.

(56) References Cited

U.S. PATENT DOCUMENTS

| | | |
|---|---|---|
| 8,761,811 B2 | 6/2014 | Alonzo |
| 8,902,288 B1 | 12/2014 | Fan et al. |
| 9,082,015 B2 | 7/2015 | Christopulos et al. |
| 9,160,993 B1 | 10/2015 | Lish et al. |
| 9,875,509 B1 | 1/2018 | Harvey et al. |
| 9,959,581 B2 | 5/2018 | Pershing |
| 10,157,502 B2 | 12/2018 | Montgomerie et al. |
| 10,163,271 B1 | 12/2018 | Powers et al. |
| 10,242,501 B1 | 3/2019 | Pusch et al. |
| 10,373,387 B1 | 8/2019 | Fields et al. |
| 10,721,280 B1 | 7/2020 | Heppner et al. |
| 2002/0196202 A1 | 12/2002 | Bastian et al. |
| 2009/0222742 A1 | 9/2009 | Pelton et al. |
| 2012/0231814 A1* | 9/2012 | Calman .................. G06Q 30/06 455/456.3 |
| 2013/0215116 A1 | 8/2013 | Siddique et al. |
| 2014/0267410 A1 | 9/2014 | Fein et al. |
| 2014/0279572 A1 | 9/2014 | Coats et al. |
| 2014/0279573 A1 | 9/2014 | Coats et al. |
| 2014/0280269 A1 | 9/2014 | Schultz et al. |
| 2014/0280644 A1 | 9/2014 | Cronin |
| 2015/0020003 A1 | 1/2015 | Karam |
| 2015/0206218 A1 | 7/2015 | Banerjee et al. |
| 2016/0035140 A1* | 2/2016 | Bickerstaff ............. A63F 13/26 345/633 |
| 2016/0048934 A1 | 2/2016 | Gross |
| 2016/0092959 A1 | 3/2016 | Gross |
| 2016/0148285 A1 | 5/2016 | Kalata |
| 2016/0267610 A1* | 9/2016 | Corbett ............. G06F 16/24556 |
| 2016/0313736 A1* | 10/2016 | Schultz ................ G05D 1/0094 |
| 2016/0314545 A1 | 10/2016 | Jessen |
| 2017/0032466 A1 | 2/2017 | Feldman et al. |
| 2017/0032574 A1 | 2/2017 | Sugaya |
| 2017/0053455 A1 | 2/2017 | Chen et al. |
| 2017/0076408 A1 | 3/2017 | D'Souza et al. |
| 2017/0108922 A1 | 4/2017 | Terahata |
| 2017/0124396 A1 | 5/2017 | Todeschini et al. |
| 2017/0173466 A1 | 6/2017 | Fahmie |
| 2017/0329329 A1 | 11/2017 | Kamhi et al. |
| 2018/0089763 A1 | 3/2018 | Okazaki |
| 2018/0158156 A1 | 6/2018 | Dintenfass |
| 2018/0322702 A1 | 11/2018 | Djajadiningrat |
| 2018/0350144 A1 | 12/2018 | Rathod |
| 2018/0374276 A1 | 12/2018 | Powers et al. |
| 2019/0004639 A1 | 1/2019 | Faulkner |
| 2019/0098255 A1 | 3/2019 | Bergmann et al. |
| 2019/0108578 A1 | 4/2019 | Spivack et al. |
| 2019/0130656 A1 | 5/2019 | Gebbie et al. |
| 2019/0180506 A1 | 6/2019 | Gebbie et al. |
| 2020/0005538 A1 | 1/2020 | Neeter |

OTHER PUBLICATIONS

Office Action for U.S. Appl. No. 16/163,146, dated Dec. 19, 2019, Little, "Method and System for Identifying Conditions of Features Represented in a Virtual Model", 24 pages.
Office Action for U.S. Appl. No. 16/163,200, dated Dec. 30, 2019, Little, "Predictive Analytics for Assessing Property Using External Data", 21 pages.
Office Action for U.S. Appl. No. 16/242,206, dated Jul. 18, 2019, Little, "Virtual Environment Generation for Collaborative Building Assessment", 9 pages.
Office Action for U.S. Appl. No. 16/395,932, dated Apr. 17, 2020, Little, "Asynchronous Virtual Collaboration Environments", 10 pgs.
Office Action for U.S. Appl. No. 16/242,206, dated May 19, 2020, Little, "Virtual Environment Generation for Collaborative Building Assessment", 9 pgs.
Office Action for U.S. Appl. No. 16/163,200, dated Jul. 10, 2020, Little, "Predictive Analytics for Assessing Property Using External Data", 26 pgs.
Office Action for U.S. Appl. No. 16/163,146, dated Jul. 2, 2020, Little, "Method and System for Identifying Conditions of Features Represented in a Virtual Model", 32 pgs.
Advisory Action and AFCP Decision for U.S. Appl. No. 16/395,932, dated Jan. 12, 2021, Little, "Asynchronous Virtual Collaboration Environments", 7 pages.
Office Action for U.S. Appl. No. 16/397,407, dated Oct. 5, 2020, Little, "Asymmetric Collaborative Virtual Environments", 12 pages.
Office Action for U.S. Appl. No. 16/395,932, dated Nov. 2, 2020, Little, "Asynchronous Virtual Collaboration Environments", 13 pages.

* cited by examiner

METHOD AND SYSTEM FOR CURATING A VIRTUAL MODEL FOR FEATURE IDENTIFICATION

FIELD OF THE DISCLOSURE

The present disclosure relates to integrating modeled data into virtual environments, and, in particular, to virtualization techniques that integrate curated area assessments data associated with modeled real properties into a virtual environment.

BACKGROUND

Virtual visualization enables one to view an overall physical region without having to actually visit the physical region. Virtual visualization is particularly useful in situations in which physically visiting the physical region is difficult or expensive. For example, when features or objects of real property (e.g., buildings, homes) within the physical region need to be assessed for various reasons, such as during a risk evaluation procedure that takes into account the cost of risk associated with the real property for underwriting the risk, it is often expensive or time-consuming to dispatch subject matter experts out into the physical region to gather information about the real property. In addition, subject matter experts are a limited resource, or have limited availability.

However, traditionally, it is difficult to incorporate information related to real property into virtual models. For example, conventional virtual models used by applications such as Google® Earth typically render 3D representations of Earth based on satellite imagery and cities from generally aerial angles, but do not provide detailed views of real property, particularly at side angles, to be of use for real property evaluators to efficiently and effectively assess the real property and various features or objects of the real property. In addition to this under-inclusive nature, conventional virtual models sometimes may be over-inclusive by modeling features that are irrelevant to assessing a particular real property. For instance, virtual models that capture a city-wide view showing a high-resolution representation of a location of a park miles away from the real property of interest are generally not tailored for assessing the real property of interest. Accordingly, there is an opportunity for systems and methods for generating virtual models tailored for efficient and effective real property evaluation in a virtual environment.

SUMMARY

In one aspect, a computer-implemented method is provided. The method may include (1) receiving, by the one or more processors, a data request from a user electronic device, wherein the data request comprises at least one or more properties of interest located at a particular portion of an overall region; (2) dynamically acquiring, by one or more processors, a virtual model for rendering the one or more properties of interest located at the particular portion of the overall region within a virtual environment at the user electronic device based on the data request, the virtual model being generated based upon a plurality of images; (3) curating, by one or more processors, the virtual model into a curated virtual model in accordance with curation rules to emphasize one or more features associated with the one or more properties that are relevant to assessing risks associated with the one or more properties; (4) obtaining, by one or more processors, one or more annotation records corresponding to an annotation object associated with the one or more features of the one or more properties from a database; and (5) populating, by one or more processors, an annotations overlay rendered in the virtual environment with information included in the one or more annotation records.

In another aspect, a system is provided. The system may include (i) one or more processors; (ii) one or more transceivers operatively connected to the one or more processors and configured to send and receive communications over one or more communication networks; and (iii) one or more non-transitory memories coupled to the one or more processors and storing computer-executable instructions. The instructions, when executed by the one or more processors, may cause the system to (1) receive a data request from a user electronic device, wherein the data request comprises at least one or more properties of interest located at a particular portion of an overall region; (2) dynamically acquire a virtual model for rendering the one or more properties of interest located at the particular portion of the overall region within a virtual environment at the user electronic device based on the data request, the virtual model being generated based upon a plurality of images; (3) curate the virtual model into a curated virtual model in accordance with curation rules to emphasize one or more features associated with the one or more properties that are relevant to assessing risks associated with the one or more properties; (4) obtain one or more annotation records corresponding to an annotation object associated with the one or more features of the one or more properties from a database; and (5) populate an annotations overlay rendered in the virtual environment with information included in the one or more annotation records.

In yet another aspect, a non-transitory computer-readable medium storing computer-executable instructions is provided. The instructions, when executed by one or more processors, may cause one or more processors to (1) receive a data request from a user electronic device, wherein the data request comprises at least one or more properties of interest located at a particular portion of an overall region; (2) dynamically acquire a virtual model for rendering the one or more properties of interest located at the particular portion of the overall region within a virtual environment at the user electronic device based on the data request, the virtual model being generated based upon a plurality of images; (3) curate the virtual model into a curated virtual model in accordance with curation rules to emphasize one or more features associated with the one or more properties that are relevant to assessing risks associated with the one or more properties; (4) obtain one or more annotation records corresponding to an annotation object associated with the one or more features of the one or more properties from a database; and (5) populate an annotations overlay rendered in the virtual environment with information included in the one or more annotation records.

Advantageously, embodiments described herein integrate data for particular real property and the various features or objects therein into a virtual model for rendering in a virtual environment. In doing so, end users of the virtual environment are able to evaluate features or objects of the desired real property remotely using the virtual environment without stepping foot onto the physical region. Further, the virtual models may be curated to exclude features or objects that may be irrelevant to assessing risk for the real property of interest, and include other data that may be relevant to assessing risk for the real property of interest.

DETAILED DESCRIPTION

Figure 1:
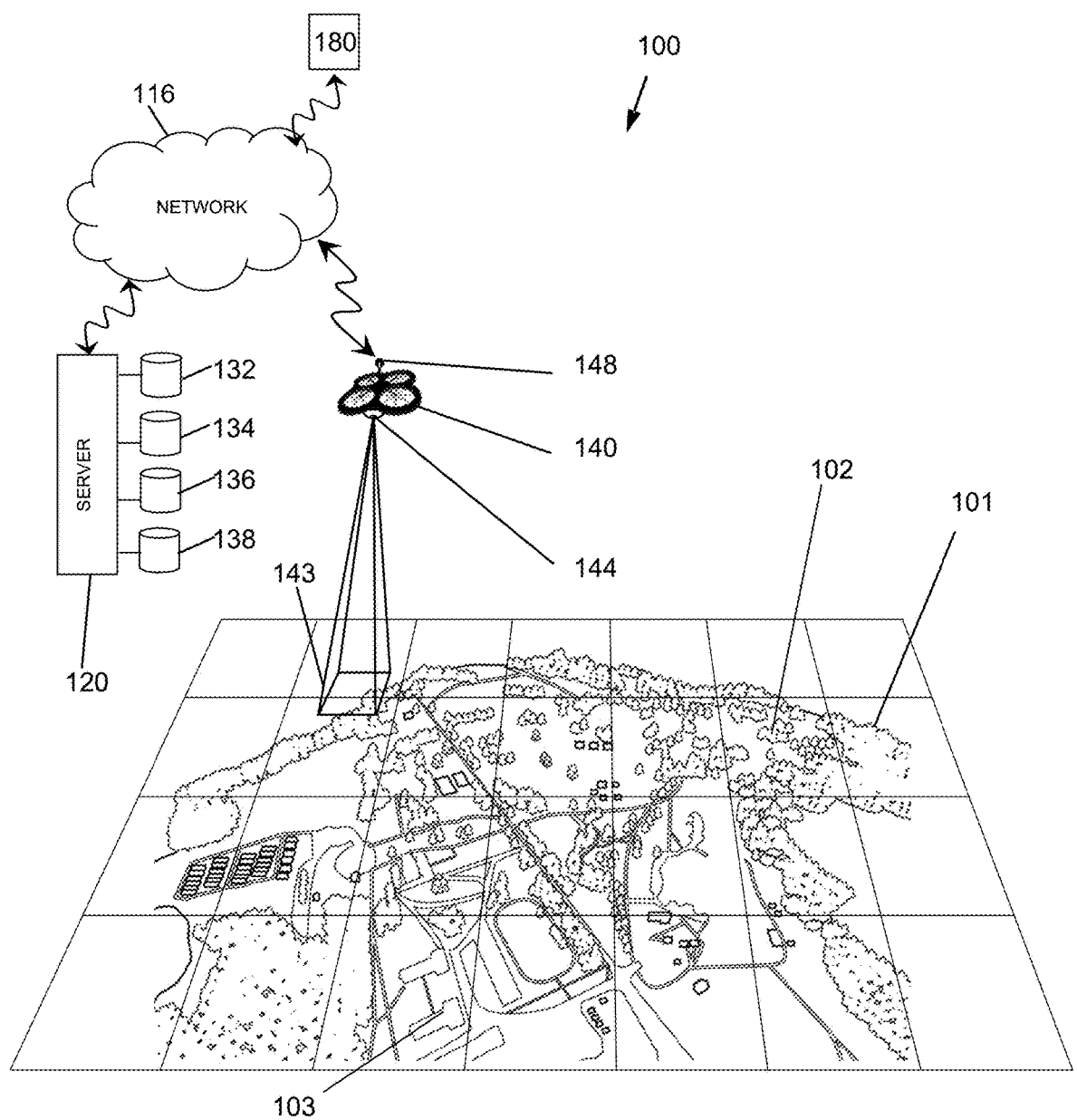
FIG. 1 depicts an example environment for capturing a set of image data representative of an overall region.

Methods, systems, and virtualization software applications and associated graphical user interfaces (GUIs) for virtual visualization of overall physical regions are described herein. To this end, the visualization may include a virtual environment in which a virtual model of a real property located in an overall region is rendered. "Real property," "property," or "one or more properties" as described and interchangeably used herein may include homes, buildings, yards, farms, or other suitable structures typically covered by insurance products, both in residential and commercial contexts. "Feature," "object," or "one or more features" as described and interchangeably used herein may include structure types, fixtures, materials of composition, or personal property associated with the property. According to aspects of the invention, virtual models may be curated to specifically depict or call user attention to external features or objects (e.g., structures, roofs, walls, trees, fences) and measurements thereof (e.g., the dimensions of the structure, material of the roof or walls, proximity of trees or fences to the structure of property) of a property located within the overall region and rendered within the virtual environment that may assist a user of the virtual environment in evaluating risk for the property. As will be further described herein, virtual models may be further curated to also include annotations and/or other public or proprietary data mapped to the features or objects described above to further assist a user when assessing the property when the virtual model is rendered in a virtual environment. The virtual environment may be viewed by a user for the purpose of evaluating the real property without stepping foot on the real property. Features or objects associated with the property that have been annotated, emphasized, or otherwise identified in the virtual model may be mapped to visual overlays when rendered in the virtual environment. Therefore, displaying such features or objects in the virtual environment may advantageously assist a user in assessing damage or risk, assessing insurance claims, training users as to what to particularly pay attention to when evaluating real property, and even underwriting when evaluating the real property for risk exposures.

With respect to training users in insurance risk assessment industries, property specialists typically are required to be physically present at a property to gather information about the physical real property and share their insights with an agent having general jurisdiction over the overall region in which the property is located. However as noted above, it is often expensive or time-consuming to dispatch property specialists out into the physical region to gather information about the real property. In embodiments described herein, the property specialist and agent may advantageously participate in a training session in the virtual environment, where the property specialist may train the agent by pointing out salient features or objects of the property rendered in the virtual environment, particularly features or objects that are relevant to assessing risks associated with the one or more properties.

For instance, the property specialist may point out, in a shared virtual environment with the agent, the construction type (e.g., frame construction type, joisted masonry construction type, light noncombustible construction type, masonry noncombustible construction type, modified fire resistive construction type, fire resistive construction type) of the property of interest, as different types of construction carry different risks. The property specialist may point out that the property is a 3-story building, ruling out a frame construction type as one of many possible construction types for the building. The property specialist may identify features or objects (e.g., structural frame, exterior bearing walls, interior bearing walls, exterior nonbearing walls and partitions, interior nonbearing walls and partitions, floor construction, roof construction, fire-resistance ratings of building materials used in the construction of the building) in the virtual environment that are often missing in traditional documentation of properties that help classify the construction type for the building. Of course, for some of the aforementioned examples, the virtual models may need to be curated using high resolution images that show the texture and/or color of material, which may be a highly relevant factor when assessing the walls and roof construction, for example.

As another example, users (e.g., property specialists) may point out other particular features or objects that appear to expose the property to liabilities or lack thereof in the virtual environment, such as a tree leaning too closely to the property, installed security mechanisms (e.g., a visible alarm system sign, a fence), a route of egress, roof damage, etc. Such features or objects exposing the property to liabilities or lack thereof may be used to evaluate a risk score for the property, which may be used in various risk applications, such as modifying insurance premiums, underwriting the property, and the like as described herein. Property specialists may emphasize features or objects of the property directly in the virtual environment (e.g., by toggling on and off visual overlays corresponding to the features or objects) that agents would not have even thought to analyze when assessing property. Accordingly, as property specialists are few in number and often a limited resource, providing the virtual environment as a shared training environment between the property specialist and agent fills a much needed void, particularly in insurance risk assessment industries.

In some embodiments, other data records relevant to the property (e.g., the market value of the property, age of the building, name of the owner of the building, name of businesses located within or in close vicinity to the property, geolocation information such as city zoning, historical claims data, etc.) may be visually represented in the virtual environment, such that a user (e.g., underwriter) may be equipped with enough information to identify the value and type of property that is being financed, for example. Different types of property (e.g., single-story home, multi-story home, residential condominiums, commercial buildings) carry different risks, and different features or objects of the property may be factors in evaluating risks. For instance, data records indicating that a particular property is over 100 years old without any historical records of roof repair may facilitate evaluating the roof in the virtual environment. As another example, data records showing the name of a business visually represented in an area corresponding to a residential neighborhood in the virtual environment may facilitate evaluating risk for the business, as different industries face different risks (e.g., bakeries have greater risk of fire than sales showrooms). Therefore, rendering the aforementioned features or objects, along with data records in the virtual environment may advantageously facilitate evaluation by users (e.g., underwriters, property specialists, agents) of the particular features or objects of the specific property of interest rendered in a virtual environment, saving the user time and resources by not needing to physically be present at the property to analyze the property.

To acquire a virtual model of one or more properties of interest in an overall region, a server may obtain a pre-existing virtual model stored in memory or from a $3^{rd}$ party for further curation, or generate a new virtual model. For example, a user (e.g., a property specialist, prospective customer, or other $3^{rd}$ party member) may physically visit a region to capture a set of image data indicative of the overall region of interest including the one or more properties of interest. The user may use modeling software on an electronic device to generate the virtual model using the captured image data, which in turn may be transmitted to the server, or alternatively, the user may use modeling software on the server itself. As another example, an imaging vehicle may be dispatched to the region to capture a set of image data indicative of the overall region of interest including the one or more properties of interest. The imaging vehicle may be, for example, an aerial imaging drone, an imaging crawler robot, or any other imaging vehicle. The imaging vehicle may be controlled autonomously, semi-autonomously, or manually by either a remote or an on-site controller or pilot. The imaging vehicle may traverse the overall region to capture a set of image data representative of the overall region, particularly of the one or more properties of interest within the overall region. The imaging vehicle may transmit the captured set of image data to the server for storage. A combination of collecting image data by a user and an imaging vehicle is also contemplated. For instance, a user may capture portions of a region that are difficult for the imaging vehicle to capture, such as underneath sections of a porch of a property of interest.

In some embodiments, the user and/or imaging vehicle may receive an address or other suitable location identification information (e.g., GPS coordinates) of the property of interest from the server. In such embodiments, the user and/or imaging vehicle may capture higher resolution images of the property at the address and lower resolution images of areas within the overall region outside a predetermined radius of the property, as features or objects contained in outside regions (e.g., a park 3 miles away) may be irrelevant when assessing the property. As will be described in greater detail below, replacing low-resolution images of the property of interest with higher-resolution images of the property may be performed in accordance with curation rules to curate or otherwise adapt virtual models.

In some implementations, a user, imaging vehicle, and/or the server may determine one or more image capture characteristics for capturing the set of image data, such as an image resolution, an image capture rate, an image angle, an altitude from which image data is captured, and/or a travel path of the imaging vehicle. In manual implementations, the user may select from a menu of previously determined routines and functions to set the image capture characteristics. Particularly, the image angle and altitude from which image data is captured may be set such that details of the top, bottom, front, back, and side views of the one or more properties may be accurately captured and presented for analysis. In automated implementations, the server may be preconfigured with image capture characteristics, and may modify the image capture characteristics based on trigger conditions. For instance, upon receiving an address of a property of interest, the server may adjust the image resolution to the next available image resolution that is higher than the preset image resolution when capturing locations within a predetermined radius from the received address.

The server may obtain the captured set of image data either stored in memory or directly from the user and/or imaging vehicle to generate a curated virtual model or otherwise curate a pre-existing virtual model of the overall region using virtual modeling techniques described below. Generally, a virtual model of an overall region including property is a digital representation of the physical property and surrounding physical areas of the physical property. The virtual model may be curated at the server via a model editing software (i.e., a suitable model generation routine) such that digital representations of portions of the physical property are modified. A virtual model that includes excessive detail captured in the set of image data, when rendered, may display information in the virtual environment that is not needed by end users to evaluate a property, for example. Therefore, in some embodiments, to improve the effectiveness of the visual experience of the user when the virtual model is rendered in a virtual environment for property assessment purpose, the server may, via a model generation routine implemented with curation rules, curate (e.g., modify, add, or remove certain vertices of a virtual model, and/or add annotations or other indicators to emphasize certain features or objects of the modeled property) or otherwise generate or modify the virtual model such that it meets a minimum level of detail so that information necessary to evaluate a property (i.e., curated area assessments data) associated with model properties may be clearly depicted in the virtual environment when rendered. Advantageously, a user viewing the virtual environment may have all the information needed to evaluate the property, and/or may not be distracted with irrelevant information about the property that is unnecessary to evaluate the property.

In some embodiments, a curation rule may identify a particular feature or object of a property and associate an annotation or other suitable indicator with the identified feature or object. For example, the model generation routine at the server may be configured to receive a user-identified assessment of a feature or object that may be relevant to assessing risks associated with the property when assessing property. The user, such as a property specialist or a user trained in curating virtual models, may use a mouse or other conventional input device and select certain features or objects, and/or place annotation objects and other suitable data objects onto select features or objects of the property. The curation rule may, upon receiving such user selections, associate the annotation objects and other suitable data objects with the selected features or objects, and subsequently generate annotation overlays and/or data record overlays corresponding to the selected one or more features to depict information included in the annotation objects and/or data objects in the curated virtual model.

Annotation objects may include notes for adding information (e.g., title of the identified feature or object, description of the condition of the identified feature or object) to modeled features or objects represented in the virtual model.

Annotation objects may also include interactive interface elements that further specify how the feature or object may be emphasized visually (e.g., highlighting, coloring, textual shading, etc.) by the annotation overlays when rendered in the virtual environment. Other suitable data objects may include information from publicly accessible records (e.g., market value of the property, age of the property, address of the property, name of business located at the property, a name of an owner of the property, agent affiliation of the property, zoning information of the property) and/or proprietary records (e.g., historical claims data recorded for the property). Because each annotation object and/or data object corresponds to a particular feature or object that has a virtual location (e.g., coordinates of a virtual coordinate system) within the virtual model, each annotation object and/or data object may be identified by the virtual location. As will be further described herein, the virtual model may be linked with an annotations database and/or data records database that store records corresponding to the annotation object and/or data object, respectively. Accordingly, the annotation object and/or data object associated with a feature or object may be integrated into the virtual model, and upon render, visual overlays may be populated at the virtual locations corresponding to the annotation object and/or data object within the virtual environment.

As another example, the particular feature or object that may be relevant to assessing risks associated with property when assessing property may be identified automatically by the model generation routine at the server. Particularly, the model generation routine may be configured with curation rules that may define templates data to include templates of features or objects relevant to assessing risks associated with property when assessing property, such as the construction type of the property, a tree leaning towards the property, security mechanisms (e.g., a visible alarm system, a fence) installed at the property, a route of egress of the property, roof damage, or any other features or objects. For example, the templates data for a fence may comprise images depicting edges of various types of fences at various view points and in different sizes and scales. The templates data for a leaning tree may comprise images of various types of trees under various conditions, such as changes in lighting or color, changes in view direction, etc. Similarly, templates data may be defined to exclude templates of features or objects that may be irrelevant to assessing risk for the property that happened to be captured at the time the user and/or imaging vehicle captured the set of image data, such as children playing in a yard, a vehicle parked a mile away from the property, a design engraved on a door of the property, exterior window shutters, decorative pillars, etc.

The curation rules may also define a manner in which the model generation routine compares the set of actual image data with the templates data based on object recognition technology to identify the particular feature or object that may be relevant to assessing risks associated with property when assessing property. For example, the curation rules may exhibit edge detection-based approaches as known in the art to cause the model generation routine to compare the templates data with the set of image data pertaining to the property to determine whether the edges of features or objects detected in the set of image data match the edges in the templates data according to a predetermined threshold (e.g. based on the number of matching edges). As another example, the curation rules may exhibit appearance-based approaches as known in the art to cause the model generation routine to compare the templates data with the set of image data pertaining to the property to determine whether the appearance of features or objects detected in the set of image data match the appearance in the templates data according to a predetermined threshold (e.g., based on the number of matching appearances). By comparing pixels between the set of image data and templates data and finding a group of pixels that match (e.g., in intensity using a sum of absolute differences approach (SAD)), features in the set of image data may be identified with respect to conditions that have already been identified in the templates data. For example, if templates data includes pixel information that is evaluated to correspond to a fence, a set of image data having pixel information that matches the pixel information included in the templates data may be predicted to be a fence. The model generation routine may then identify or otherwise mark (e.g., tag) any of the image data that match the templates for inclusion in the curated virtual model, such that features or conditions captured in the images are represented in the virtual mode. Any unmarked image data may be excluded from the curated virtual model, in some embodiments, or may be deemphasized. The server may store the resulting curated virtual models in a model database. Because the curated virtual model may include less data than a conventional virtual model that does not exclude any features or objects that may be irrelevant to assessing risk for various properties, the server or other suitable electronic device may advantageously use less memory space to render the curated virtual model than for other conventional virtual models in the virtual environment.

In some embodiments, the curation rules may also define a manner in which the model generation routine updates a pre-existing virtual model. For example, the curation rules may cause the model generation routine to receive identification information for a desired property (e.g., an address or other location information for the property of interest) and compare such information to location metadata included in image data used when the pre-existing virtual model was initially created. Upon identifying the matched set of image data corresponding to the address of the property of interest, the curation rules may cause the model generation routine to evaluate the image resolution of the matched set of image data to determine whether it meets a predetermined image resolution threshold. If the matched set of image data is determined to not meet the predetermined image resolution threshold, the curation rules may cause the model generation routine to replace the low-resolution images with higher-resolution images of the property. If higher-resolution images of the property are unavailable in an image database, the curation rules may cause the model generation routine to inform a user or otherwise dispatch an imaging vehicle to capture images of the property at the specified address at a specified resolution.

Obtaining higher-resolution images may be necessary in the event that the model generation routine is unable to determine whether a captured set of image data matches with templates data (e.g., due to a lack of image quality of a portion of the set of image data). Obtaining higher-resolution images for a feature or object of a property may also be necessary in the event that a user is unable to identify the feature or a condition of the feature when the virtual model is rendered in the virtual environment. Accordingly, the model generation routine may generate a notification for a user and/or a command to the remote imaging vehicle to collect more images for the particular feature or object. Upon receiving the additional images, the model generation routine may continue to assess the images in a similar manner described above.

In some embodiments, as briefly described above, the feature or object that may be relevant to assessing risks associated with property assessing property may be identified and assessed by a user viewing the feature in a virtual environment at a user electronic device. Particularly, the model generation routine may be configured with curation rules that receive messages from the user electronic device. In some instances, the messages may include an assessment of the feature. In other instances, particularly when the image data used in generating the virtual model does not clearly depict the feature when rendered in the virtual environment for user assessment, the message may include an indication that the feature cannot be assessed. The message may further include an annotation made by the user indicated in the virtual environment at a virtual coordinate corresponding to the one or more features, so that the feature condition rules may translate the virtual coordinate into Global Positioning System (GPS) coordinates corresponding to the one or more features and subsequently generate a request for a user and/or an image capture request to the remote imaging vehicle for capturing additional images of the one or more features.

In some embodiments, the model database may store multiple versions of a particular virtual model. For example, one version of the virtual model may be based on coarse image data captured in some portions of the property and fine image data captured in other portions of the property of interest, and a second version of the virtual model may be based on fine image data captured in all portions of the property of interest. As another example, one version of the virtual model may include data objects based on publicly accessible records (e.g., market value of the home, age of the home, etc.) and/or proprietary records (e.g., historical claims data), and a second version of the virtual model may exclude such data objects. As another example, one version of the virtual model may include annotation objects that emphasize one or more features of the property, and a second version of the virtual model may exclude such annotation objects. Accordingly, the server may generate tailored virtual models appropriate for a given situation. For example, for training purposes described above, the server may generate a virtual model that includes annotation objects associated with one or more features of the property to render visual overlays corresponding to the annotation objects upon render in a virtual environment to help train agents as to what to particularly look for when assessing property. As another example, for underwriting purposes described above, the server may generate a virtual model that includes data objects based on public and/or proprietary records associated with one or more features of the property to render visual overlays corresponding to the data objects upon render in a virtual environment to help inform underwriters identify the risk for the type of property that is being financed.

The users described above (e.g., property specialists, agents, underwriters) may interact with a user electronic device to view a rendering of the virtual environment. The user electronic device may be a computer, a smart phone, a tablet, smart glasses or goggles, a smart watch, a personal virtual reality device, a visualization base station, or any other electronic device. In some embodiments, the user electronic device is interconnected with a separate display device to enable the user to view the virtual environment in a virtual or mixed reality environment. According to aspects, the display device may be a flat panel screen, virtual reality display device, or a mixed-reality display device communicatively coupled to the user electronic device. In other embodiments, the display device may be the user electronic device (such as when the display device is a virtual or mixed reality headset capable of communicating directly with the server). In some embodiments, multiple user electronic devices may communicate with the server to initiate rendering of the same virtual environment simultaneously, such as during a shared training session between at least two users (e.g., a property specialist and an agent).

In one aspect, the user electronic device may access the virtual environment by sending, to the server, a data request indicative of a particular portion of the overall region, such as the desired property. The data request may include an address of the property, a zip code of the property, or other identification information of the property. The data request may also specify a particular version of the virtual model, such as any version of the virtual model described above. In this way, an agent may request a version of the virtual model including annotation objects and/or data objects, and an underwriter for example may request a different version of the virtual model including data objects and excluding annotation objects. The data request may also include an indication of the type of user electronic device, which may indicate a type of virtual environment (e.g., mixed reality environment, virtual reality environment) it supports. In response, the server may dynamically provide, to the user electronic device, a virtual environment or mixed reality environment for rendering an appropriate virtual model for the particular property within the overall region based on the data request.

It should be appreciated that when the user views the virtual environment via the user electronic device or the display device, portions of the virtual environment may not be visible. To this end, the portion of virtual environment visible to the user may be defined by a virtual camera object. The user may interact with the display device or user electronic device to move or otherwise interact with the virtual camera object. For example, the user may move, zoom, rotate, or otherwise adjust the virtual camera object. The portion of the virtual environment viewable from the virtual camera object is referred to as the viewing angle.

In some embodiments, the user electronic device or display device analyzes a viewing angle to determine how the virtual environment should be depicted by the user electronic device or the display device. In these embodiments, rendering involves the user electronic device analyzing the virtual model to determine how the user electronic device or the display device should depict the virtual environment based on the viewing angle. In embodiments describing communications that have sufficiently low latency, such as 5G technologies and beyond, the user electronic device may transmit indications to the server of any change to the viewing angle and the server may respond with visual representations of how the virtual environment should be depicted. Accordingly, in these embodiments, "providing" the virtual environment to a user electronic device or display device for rendering may include the server's response indicating how the virtual environment should be depicted.

In another aspect, the user electronic device may interact with the virtual environment by activating display of overlays corresponding to the annotation objects included in the virtual models associated with the features or objects of the property. For example, upon selection (e.g., by touch using a personal virtual reality device, by line of sight using smart goggles) of digital representations of the features or objects of the property rendered in the virtual environment, the server may generate an annotations overlay corresponding to the selected one or more features to depict information included in the annotation objects associated with particular regions and/or features. The server may then update the virtual environment to populate the annotations overlay. Accordingly, when the user electronic device refreshes the rendering of the virtual environment, the virtual environment may include these annotation overlays. Other overlays are contemplated. In some embodiments, the server may generate a data records overlay on the virtual environment to depict information included in the data objects (e.g., information from public records, propriety records, or other third party source) associated with particular regions and/or features.

Advantageously, users of the user electronic device may be able to evaluate risk of the property according to what they see in the virtual environment without being physically present at the property. Accordingly, the user electronic device may communicate a risk assessment back to the server, which in turn may use the risk assessment to calculate a risk score for various risk-based processes. The risk score can be used in underwriting processes to determine whether an entity associated with the server may want to insure the property. The risk score may also be used after a customer purchases a policy from the entity, so that the entity may re-evaluate whether it wants to continue insuring the property, or whether any terms of a policy corresponding to the property should be updated based on the risk score. The risk score may also be used in adjudicating claims, by identifying whether a damaged feature or object of the property claimed by the customer is accurate, for example.

FIG. 1 depicts an example environment 100 for capturing a set of image data representative of an overall region 101. As illustrated, the environment 100 includes an imaging vehicle 140 configured to capture the set of image data. The overall region 101 may include one or more properties. Although FIG. 1 only depicts a single imaging vehicle 140, in other embodiments multiple imaging vehicles 140 may be used to capture the set of image data, and/or a user (e.g., a property specialist, prospective customer, or other 3rd party member) may capture the set of image data. Further, while FIG. 1 depicts the imaging vehicle 140 as an aerial drone, additionally or alternatively, the imaging vehicle(s) 140 may include a non-aerial drone or vehicle, such as a crawler or an aquatic drone. Further, although the image data is generally described herein as being visual-spectrum image data, the image data may include thermal imaging data and/or image data indicative of radiation levels. For instance, capturing and representing a chemical leak or unusual odor in the virtual model may signal to a user upon render in a virtual environment to further assess the source of the chemical leak or unusual odor.

According to certain aspects, the imaging vehicle 140 may be manually or autonomously piloted to capture a set of image data while traversing the overall region 101. The imaging vehicle 140 may include an imaging apparatus 144 configured to capture image data indicative of a field of imaging 143. As the imaging vehicle 140 traverses the overall region 101, the field of imaging 143 also moves. Accordingly, the imaging vehicle 140 may capture imaging data indicative of the different portions of the overall region 101. It should be appreciated that in some embodiments, the field of imaging 143 is not at a fixed angle below the imaging vehicle 140, but may pan, tilt, and/or zoom to capture image data indicative of the overall region 101 at different angles, such that 360° views, including side views, of the property may be captured. In some implementations, the imaging vehicle 140 captures image data such that there is an overlap between successive sets of captured image data. These overlaps provide additional image data (e.g., different views) about the same location of the overall region 101, which enables more accurate determination of the identities and dimensions of features (e.g., structures, trees, roads, water, and so on) of the overall region. It should be appreciated that if the imaging vehicle 140 captures the set of image data at a high-altitude and/or without focusing on a particular portion of the overall region 101, the set of image data may lack sufficient detail to support some of the aforementioned curation tasks. It should also be appreciated that high-resolution image data may be unnecessary for certain portions of the overall region 101. For example, if the aim for generating the virtual model is to identify real properties located in sub-region 103, sub-region 103 indicative of real property may be captured in a higher resolution than another region (e.g., sub-region 102) within the overall region 101 that is miles away from sub-region 103.

The imaging vehicle 140 may also include a communication apparatus 148 for transmitting, via a wireless communication network 116, the captured set of image data to a server 120. The communication network 116 may support communications via any standard or technology (e.g., GSM, CDMA, TDMA, WCDMA, LTE, EDGE, OFDM, GPRS, EV-DO, UWB, IEEE 802 including Ethernet, WiMAX, and/or others). The server 120 may store the transmitted image data at an image database 134.

According to aspects, the server 120 may analyze the image data stored at the image database 134 to generate curated virtual models of the overall region 101. To generate a curated virtual model, the server 120, via a model generation routine, may identify features or objects of the property, determine measurements, such as dimensions (e.g., square footage of the property, the height of the property, etc.) and textual information (e.g., material of roof tiles, walls, etc.) for the various features of the property within the overall region 101, and/or adapt the image data to appear on the appropriate dimension of each feature in the virtual model. The server 120 may also adapt the image data in accordance with the curation rules described above when curating virtual models. Further, the server 120 may link the virtual model with an annotations database 138 and/or data records database 132 that store records corresponding to the annotation object and/or data object, respectively, to integrate such objects into the virtual model. The server 120 may then store the generated virtual model at a model database 136 for rendering in a virtual environment. It should be appreciated that although data records database 132, image database 134, model database 136, and annotations database 138 are depicted as separate databases in FIG. 1 for illustration purposes, the databases may be a common database or consolidated into less databases.

The remote user electronic device 180 may access the virtual environment by sending, to the server 120, a data request indicative of a particular portion of the overall region, such as a desired property. The server 120 may include a communication apparatus for providing, via the wireless communication network 116, the virtual environment to the remote user electronic device 180. In some embodiments, the server 120 may provide an instantiation of the virtual model to the remote user electronic device 180 for the remote user electronic device 180 to render in a virtual environment. The remote user electronic device 180 may be a laptop computer, a tablet computer, a smartphone, smart glasses or goggles, a smart watch, a personal virtual reality device, a visualization base station, or any other electronic device. Accordingly, a user accessing the remote user electronic device 180 may view a rendering of the curated virtual model for one or more properties of interest to review features or objects contained in the one or more properties to evaluate any risk for the property.

Figure 2:
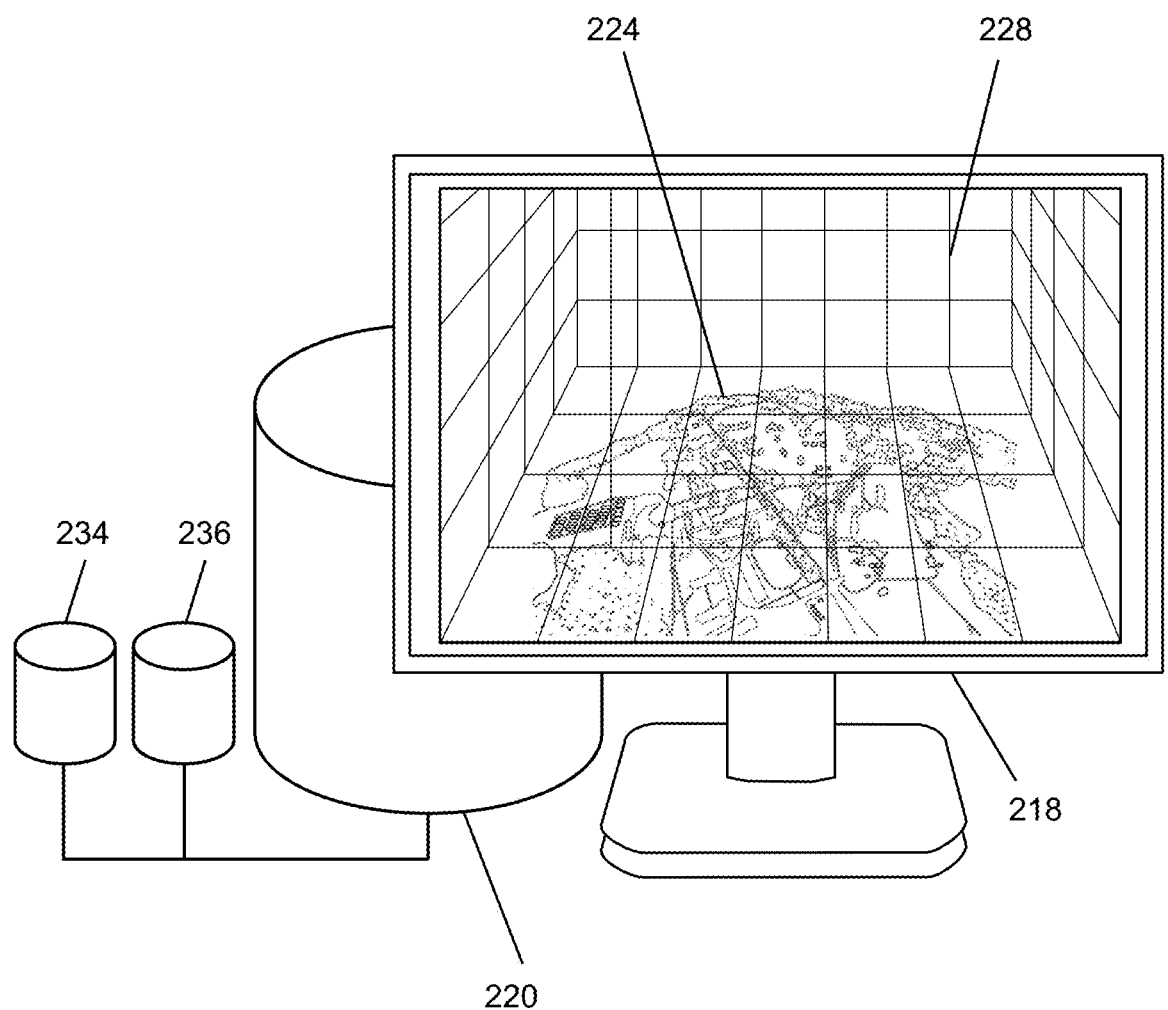
FIG. 2 depicts a rendering of a virtual environment that includes a virtual model of an overall region.

FIG. 2 depicts a rendering 224 of a virtual environment 228 that includes a curated virtual model of an overall region. In the illustrated embodiment, the rendering 224 is displayed on a display screen 218. To generate the rendering 224, a server 220 (such as the server 120 of FIG. 1) accesses a model database 236 (such as the model database 136 of FIG. 1) to obtain virtual models of the overall region and/or the features of properties thereof. In some embodiments, the server 220 may also access an image database 234 to obtain images relevant to user analysis. The server 220 may then generate the virtual environment 228 in which the virtual model of the overall region is rendered. Accordingly, a user electronic device (such as the user electronic device 180 of FIG. 1) communicative coupled to the server 220 may access the virtual environment 228. A user may then interact with the virtual environment 228 to view the renderings 224 from different angles and/or zoom levels.

Figure 3:
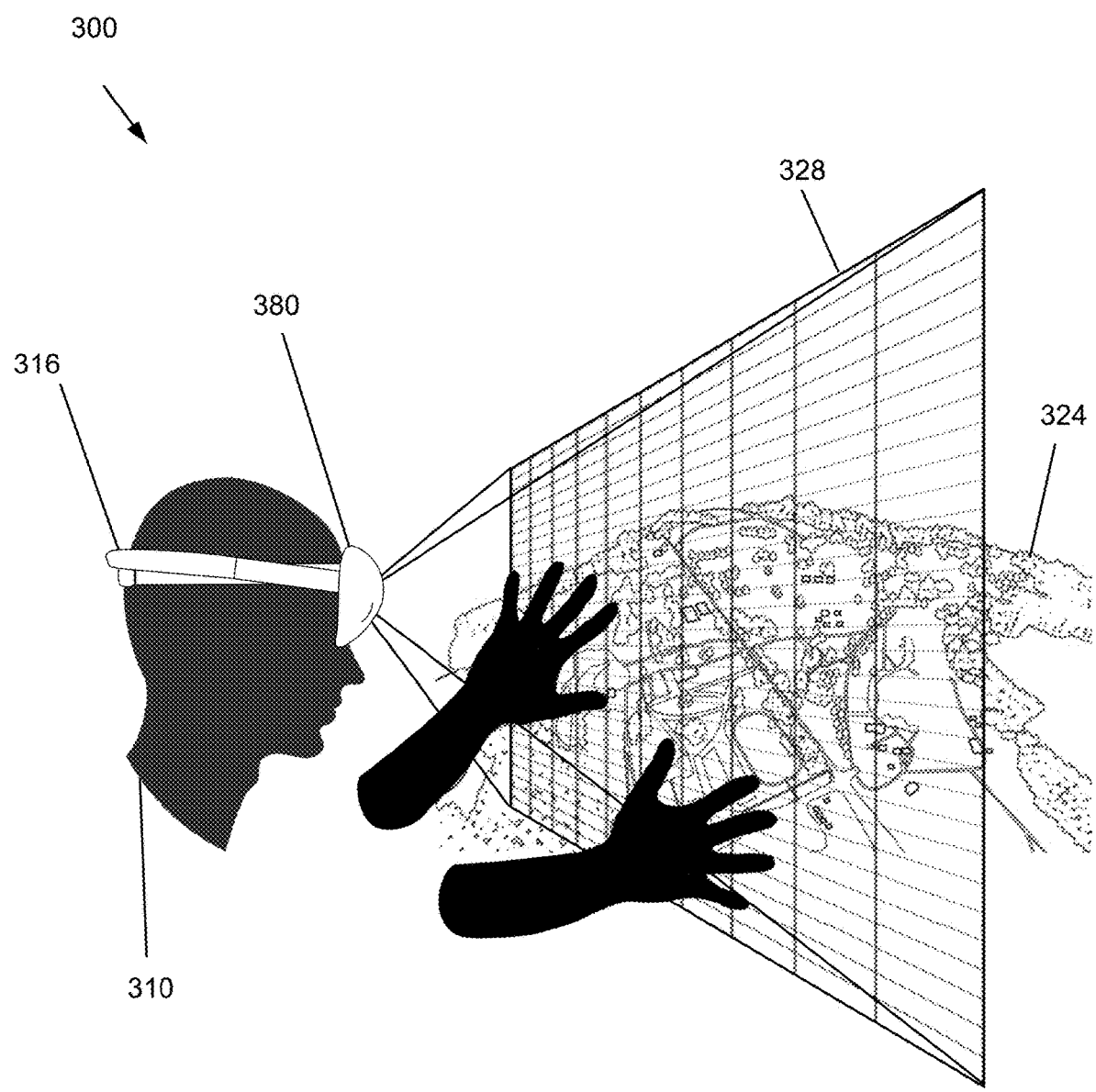
FIG. 3 depicts an example system wherein an exemplary user electronic device is configured to present renderings of a virtual model to a user in a virtual reality environment.

FIG. 3 depicts an example system 300 wherein an exemplary user electronic device 380 is configured to present renderings 324 of the virtual model to a user 310 in a virtual reality environment 328. The user electronic device 380 may be a virtual imaging device configured to be placed in front of the user's eyes, like a pair of goggles or spectacles, and secured by a head gear mechanism 316. As the user 310 views the renderings 324 of the overall region within the virtual environment 328, the user 310 may use hand gestures to manipulate the virtual environment 328. For example, the user 310 may manipulate the virtual environment 328 in order to change the perspective, angle, size, zoom factor, resolution, or other aspects of how the virtual environment 328 is displayed, such as populating visual overlays (e.g., annotation overlays, data records overlays). Additionally or alternatively, the user 310 may use a control device (not depicted) to manipulate the virtual environment 328. Of course, the user 310 may manipulate the virtual reality environment 328 using any known technique. Other virtual imaging devices are contemplated, such as a laptop computer, a desktop computer, a tablet computer, a smartphone, or other suitable electronic devices.

Figure 4:
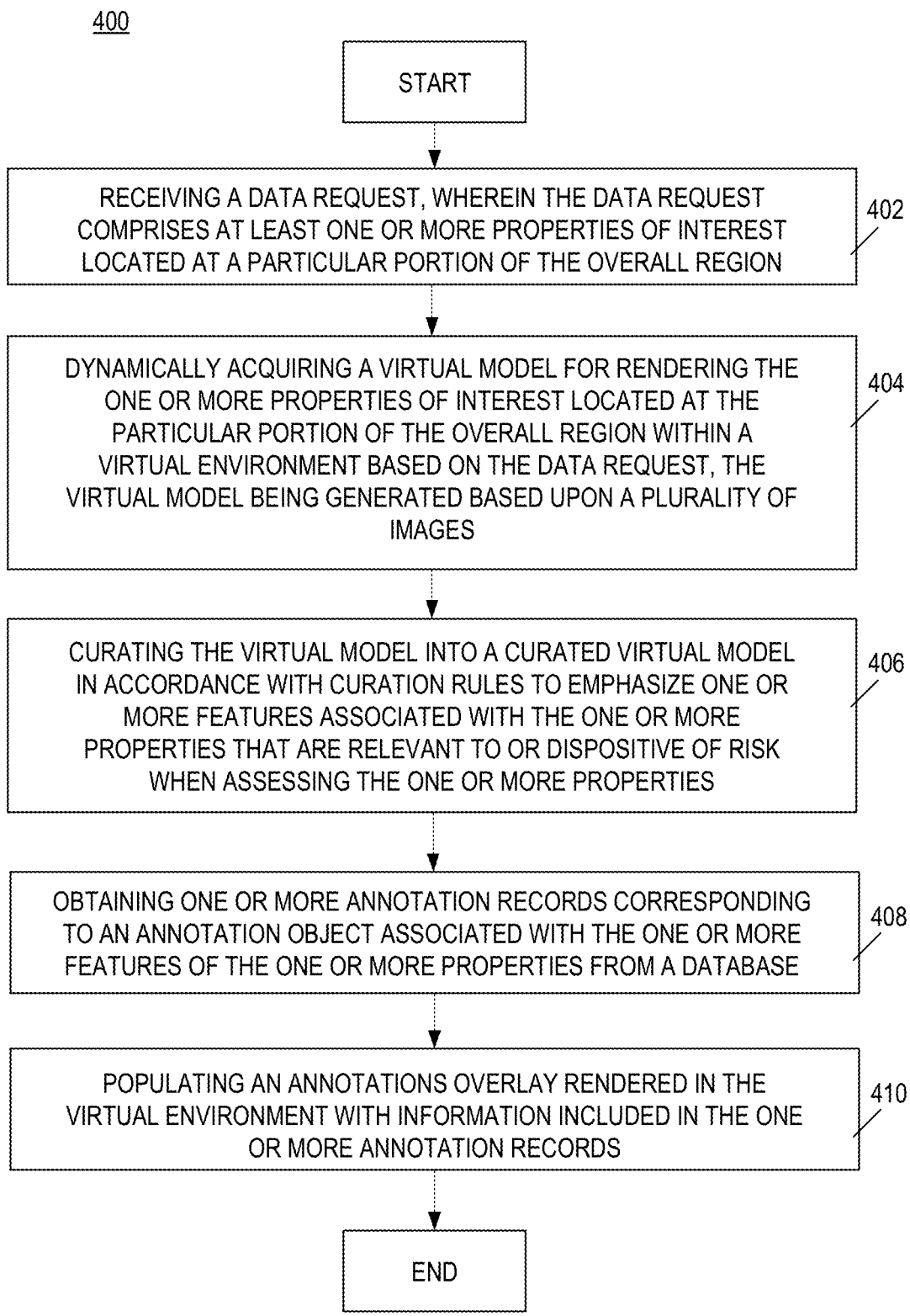
FIG. 4 depicts a flow chart of an example method for curating virtual models and populating annotation overlays in a virtual reality environment.

FIG. 4 depicts a flow chart of an example method 400 for populating visual overlays to emphasize features or objects of a property within a virtual environment. The method may be executed by a server (such as the server 120 of FIG. 1) in communication with a user electronic device (such as the remote user electronic device 180 of FIG. 1). The method 400 may begin when the server receives a data request from a user electronic device (block 402). The data request may include location information of at least one or more properties of interest located at a particular portion of the overall region, such as geographic coordinates or address of the one or more properties. The data request may also specify a particular version of the virtual model, such as a virtual model having annotation objects integrated within. In this way, an agent for example using the user electronic device may request a version of the virtual model including annotation objects, for example.

At block 404, the server may dynamically acquire, from a model database (such as the model database 136 of FIG. 1), a virtual model for rendering the one or more properties of interest located at the particular portion of the overall region within a virtual environment at the user electronic device based on the data request. Some virtual models may be overview models of an entire city and therefore may not be tied to a particular street address, whereas other virtual models may be associated with a range of geographic coordinates or addresses modeled by the virtual model of the overall region. For example, metadata included in the virtual models may include such location information. Accordingly, the server may query the model database to identify any virtual models for property located within the range of geographic coordinates modeled by the virtual model of the overall region, or any virtual models of property that match the address, in accordance with the data request. As described herein, the virtual models of the overall region may be generated based on image data stored in an image database (such as the image database 134 of FIG. 1) after being captured by a user and/or an imaging vehicle (such as the imaging vehicle 140 of FIG. 1), as will be described in further detail with respect to FIG. 6.

At block 406, the server may curate the virtual model in accordance with the curation rules to emphasize one or more features that are relevant to assessing risks associated with the one or more properties when assessing the one or more properties represented in the virtual model. As described above, the virtual model of the overall region may be curated to specifically include external features or objects (e.g., structures, roofs, walls, trees, fences) and measurements thereof (e.g., the dimensions of the structure, material of the roof or walls, proximity of trees or fences to the structure of property) of a property located within the overall region and rendered within the virtual environment that may assist the server or a user of the virtual environment in evaluating risk for the property. In some embodiments, the virtual models may be further curated to also include annotations and/or other public or proprietary data mapped to the features or objects to further assist the server or the user when assessing the property when the virtual model is rendered in a virtual environment. Therefore, one or more annotation objects or data objects may be integrated into the curated virtual model.

At block 408, the server may obtain one or more annotation records and/or data records associated with the one or more features of the one or more properties from an annotations database (such as the annotations database 138 of FIG. 1) and/or data records database (such as the data records database 132 of FIG. 1) that store the records corresponding to the annotation object and/or data object, respectively, as described above.

At block 410, the server may populate an annotations overlay and/or data records overlay rendered in the virtual environment with information included in the one or more annotation records and/or data records. Because records of annotation objects and/or data objects include interactive interface elements that specify how a feature or object may be emphasized visually exist in the annotation records and/or data records, the visual overlays may be depicted in various ways, such as with various highlighting, coloring, textual shading, etc. Various ways of emphasizing features or objects may be advantageous to differentiate certain features from others. For example, for annotations that emphasize features such as a security system, the annotation overlay may be displayed in a first color (e.g., green) or other first depiction characteristic (e.g., with a first outline of a certain shape, such as a circle), whereas for annotations that emphasize features such as a leaning tree, the annotation overlay may be displayed in a second color (e.g., red) or other second depiction characteristic (e.g., with a second outline of a certain shape, such as a square). This way, features that reduce risk (e.g., a security system) may be easily discerned from other features that increase risk (e.g., a leaning tree). Other ways of emphasizing features are envisioned, such as enlarging the feature or object or any suitable animation effect that serves to emphasize the feature or object.

Figure 5:
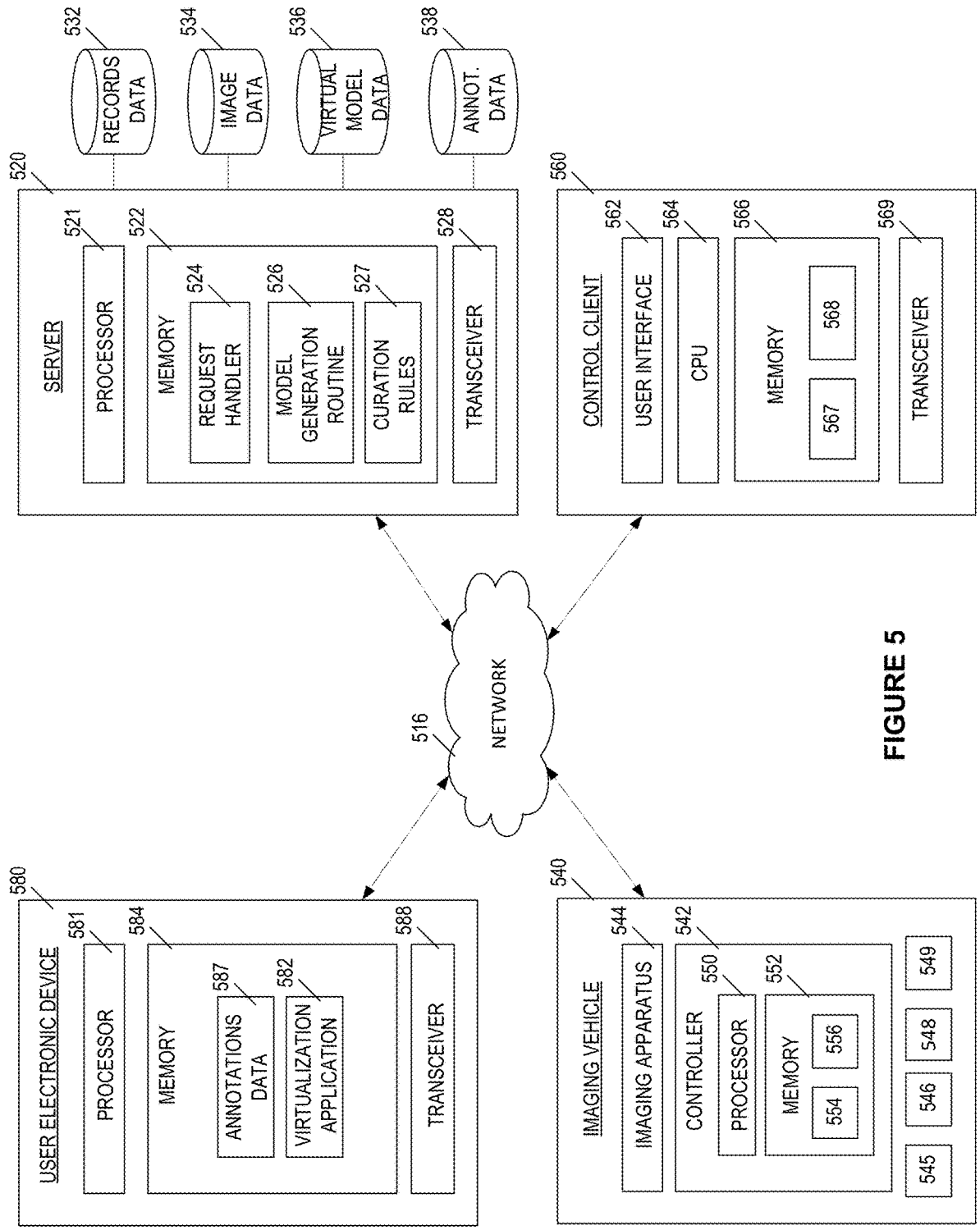
FIG. 5 depicts a block diagram of an exemplary system for curating virtual models and populating annotation overlays in a virtual reality environment.

FIG. 5 depicts a block diagram of an exemplary system 500 that may enable rendering virtual models in a virtual environment at the user electronic device. As illustrated, the system 500 may include a server 520 (such as server 120), an imaging vehicle 540 (such as imaging vehicle 140), a remote control client 560, and a user electronic device 580 (such as remote user electronic device 180), which communicate with one another via a communication network 516. The communication network 516 may include one or more wired or wireless communication links (such as the wireless communication network 116).

As illustrated, the server 520 may communicate with the remote control client 560 via the communication network 516 to control operation of the remote imaging vehicle 540. To this end, the server 520 may transmit an instruction to the remote control client 560 to dispatch the remote imaging vehicle 540 to capture image data representative of a particular location. Accordingly, in response to receiving the instruction, the remote control client 560 may transmit one or more control commands to the remote imaging vehicle 540 to cause the remote imaging vehicle 540 to capture the requested image data. The remote control client 560 may be any electronic device, for example, a control or command station computer, a laptop computer, a tablet computer, a smartphone, etc. The remote control client 560 may include one or more processors 564 configured to execute applications stored at a computer-readable memory 566. The memory 566 may be a computer-readable non-transitory storage device that includes persistent (e.g., a hard disk) and/or non-persistent (e.g., RAM) memory components. For example, the memory 566 may store location data 567 and/or sensor data 568.

The remote control client 560 may include the user interface module 562 which may include drivers that support user input devices such as a button, a keyboard, a mouse, a toggle, a joystick, a wheel, or any other input device including those that simulate the appearance of a cockpit. The remote control client 560 may also include one or more transceivers 569 configured to communicate over the communication network 516, for example, to receive commands from the server 520 and/or to control operations of the remote imaging vehicle 540. In some embodiments, the server 520 controls the operation of the imaging vehicle 540 directly without the use of the remote control client 560.

The remote imaging vehicle 540 may include a controller 542 that controls operation of one or more proximity sensors 545, one or more stabilization sensors 546, a Global Positioning System (GPS) unit 549, and/or an imaging apparatus 544 in order to capture low resolution images of areas surrounding a property of interest within an overall region and/or high resolution images of the property itself. The controller 542 may include one or more processors 550 configured to execute instructions stored at a computer-readable memory 552 to control operation of the remote imaging vehicle 540. To this end, the controller 542 may be remotely controlled by one or more commands received from the remote control client 560 and/or the server 520. Accordingly, the remote imaging vehicle 540 may include a communication module 548 including one or more transceivers configured to communicate over the communication network 516, for example, to receive control commands and/or to transmit image data captured by the imaging apparatus 544. The transmitted image data may be stored in the image database 534.

When in operation, the controller 542 may invoke a stabilization module 556 to retrieve data from stabilization sensors 546 (e.g., directional speed sensors, rotational speed sensors, tilt angle sensors, inertial sensors, and/or accelerometer sensors) to control movement of the remote imaging vehicle 540. The remote imaging vehicle 540 may be particularly controlled to capture 360° views, or as close to 360° views as possible, of the property of interest (or of relevant portions of the property of interest). To this end, the stabilization module may implement one or more control functions that perform PID (proportional-integral-derivative), fuzzy logic, nonlinear, etc. control to maintain the stability of the remote imaging vehicle 540. In response to receiving commands from the server 520 and/or remote control client 560, the controller 542 may analyze data retrieved from these stabilization sensors 546 to control the stability of the remote imaging vehicle 540 as the remote imaging vehicle 540 traverses a path, thereby improving the quality of the image data captured by the imaging apparatus 544.

In some embodiments, the proximity sensors 545 are configured to detect nearby objects or obstructions, such as trees and fences, which may affect any risk assessment of the property. These proximity sensors 545 may include any sensors that may assist the control module 554 in determining a distance and a direction to any nearby object. The one or more proximity sensors 545 may include ultrasonic sensors, infrared sensors, LIDAR (Light Detection and Ranging), a stereo vision system (SVS) that may utilize the imaging apparatus 544.

The controller 542 may utilize locationing techniques to ensure that the remote imaging vehicle 540 follows a determined path. To this end, the GPS unit 549 may be configured to implement a positioning protocol, such as "Assisted GPS" (A-GPS), satellite GPS, or any other suitable global positioning protocol or system. For example, A-GPS utilizes terrestrial cell phone towers or Wi-Fi hotspots (e.g., wireless router points) to more accurately and more quickly determine location of the device. On the other hand, satellite GPS generally may be more useful in more remote regions that lack cell towers or Wi-Fi hotspots.

The server 520 may include one or more processors 521 and a memory 522 that stores one or more applications. The one or more processors 521 may interface with the memory 522 to execute the one or more applications. The memory 522 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

One application stored at the memory 522 may be a request handler 524 that processes requests received from the user electronic device 580. The request handler 524 may receive and process the data requests received from the user electronic device 580. Although only one user electronic device is shown in FIG. 5, it should be noted that additional user electronic devices (e.g., a second user electronic device) may also transmit data requests to the request handler 524, particularly in training situations as described herein.

Another application stored at the memory 522 may be a model generation routine 526 that generates and/or curates virtual models based on the data request and image data stored at an image database 534, in accordance with curation rules 527 as described herein. As described above, virtual models may be linked with an annotations database 538 and/or data records database 532 that store records corresponding to the annotation object and/or data object integrated in the virtual models, respectively. Further, the model generation routine 526 may store the virtual models in a virtual model database 536, and/or generate a virtual environment based on one or more virtual models stored at the virtual model database 536.

The server 520 may also include one or more transceivers 528 configured to communicate over the communication network 516. More particularly, the one or more transceivers 528 may be WWAN, WLAN, and/or WPAN transceivers functioning in accordance with IEEE standards, 3GPP standards, or other standards, to receive and transmit data over the communication network 516. In some embodiments, the server 520 may perform the functionalities as discussed herein as part of a "cloud" network, or may otherwise communicate with other hardware or software components within the cloud to send, retrieve, and/or otherwise interact with data.

As illustrated, the transceivers 528 of the server 520 may provide a virtual environment to a user electronic device, such as the user electronic device 580 via the communication network 516. To this end, the user electronic device 580 may include one or more transceivers 588 configured to access the virtual environment over the communication network 516.

The user electronic device 580 may also include one or more processors 581 and memory 584 that stores one or more applications. The one or more processors 581 may interface with the memory 584 to execute the one or more applications. The processors 581 may include both central processing units (CPUs) and graphical processing units (GPUs). Accordingly, the GPUs may be utilized when performing activities related to rendering the virtual environment and the CPUs may be utilized when performing various other tasks, such as transmitting data requests to the server 520. The memory 584 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

One application stored at the memory 584 may be a virtualization application 582 configured to communicate with the server 520 that is executed by one or more processors 581 to display or otherwise present to the user a virtual environment that includes a rendered instantiation of one or more of the virtual models stored in the model database 536. Although not shown, a second user electronic device having similar components as those described with respect to the user electronic device 580, may also be communicatively coupled to the server 520 to access the rendered instantiation of one or more of the virtual models stored in the model database 536 at the same time as the user electronic device 580, such as during a shared training session. In these embodiments, the user electronic device 580 and the second user electronic device may communicate over the communication network 516 and/or another communication network adapted for long range communications (such as a wide area network, virtual private network, etc.). In training scenarios as described above for instance, an agent and property specialist may interact with the user electronic device 580 and the second user electronic device, respectively, to view the same virtual environment simultaneously. Annotations data 587 associated with the virtual models may also be stored at the memory 584, which may include annotations received from the annotations database 538 or annotations made by the user of the user electronic device 580. User-specified annotations may be sent from the user electronic device 580 to another user electronic device 580 via the communication network 516 for presentation to another user during a collaborative session (e.g., a training session). Such user-specified annotations may additionally or alternatively be sent to the server 520 for storage in the annotations database 538.

It should be noted that the relationship between the server 520 and user electronic device 580 is primarily described as a client/server relationship herein. That is, the server 520 hosts the virtual environment, receives user inputs from connected user electronic devices, and provides the state of the virtual environment (e.g., including an updated viewing angle, annotation overlays, etc.) back to the user electronic devices. However, it should be contemplate that a peer-to-peer model may also be implemented, where each client (e.g., user electronic device 580) sends inputs (e.g., activated annotation overlays) to all peer clients (e.g., second user electronic device) so that a common state of the virtual environment is maintained by each client.

Figure 6:
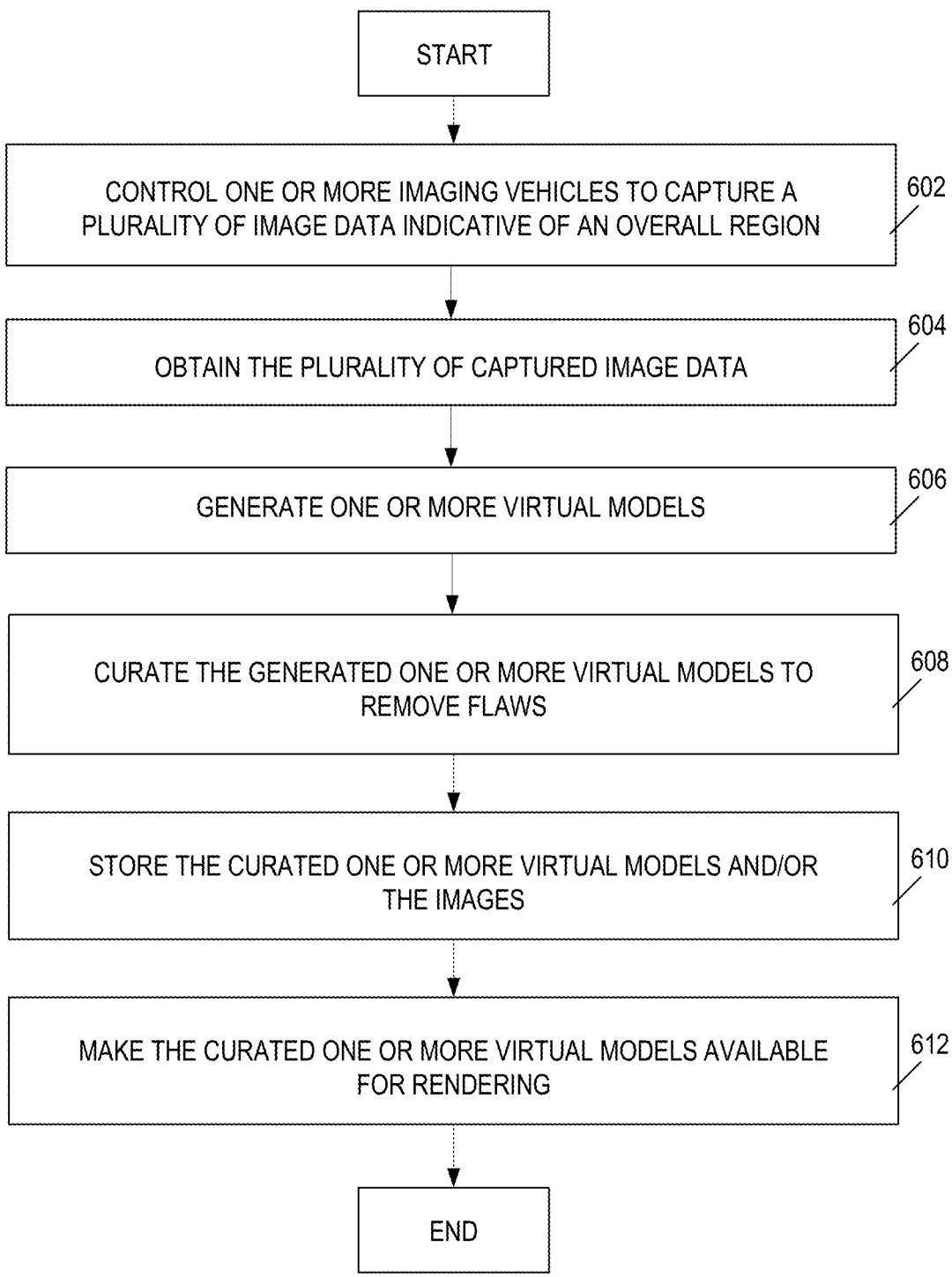
FIG. 6 depicts a flow chart of an example method for generating and curating virtual models.

FIG. 6 depicts a flow chart of an example method 600 for generating virtual models. A server, such as the server 520 of FIG. 5, may perform the method 600. The method 600 may begin when the server controls one or more imaging vehicles (such as the imaging vehicle 540 of FIG. 5) to capture a plurality of image data of an overall region including a desired property (block 602). To control the imaging vehicle, the server may either transmit commands directly to the imaging vehicle or indirectly via a remote control client (such as the remote control client 560 of FIG. 5). To this end, the server may format the commands in accordance with a control API of the imaging vehicle. For example, the API may enable the server to control the path of the imaging vehicle and/or any of the image capture characteristics. In some scenarios, the command may indicate a target location (e.g., the target location represented in the data request generated by a user electronic device) within the overall region. Accordingly, the API may respond to an input of the target location by generating a series of control commands that navigates the imaging vehicle proximate to the target location.

As the imaging vehicle traverses the path, the imaging vehicle may capture a plurality of image data representative of the overall region at the target location. The imaging vehicle may embed the captured data with metadata that indicates the location of the overall region and/or features thereof. For example, the metadata may include physical coordinates of the imaging vehicle, an altitude of the imaging vehicle, pan/tilt/zoom data of the imaging apparatus, a speed of the imaging vehicle, and/or other data that enables the correlation of captured image data to physical coordinates.

The manner in which the imaging vehicle captures the image data may also be controlled by the server. In one example, the server may send a command to capture image data in a sweep mode in which the imaging apparatus of the imaging vehicle is configured to capture image data from a wide angle so as to capture image data of larger portions of the overall region. In another example, the server may send a command to capture image data representative of a target location to capture image data from a narrow angle so as to capture image data of focused portions of the overall region.

In this example, the imaging vehicle may be configured to point the imaging apparatus at the target location from a variety of different angles as the imaging vehicle traverses the path.

In some embodiments, the imaging vehicle stores the captured image data locally until the imaging vehicle returns to a dock or port. Once arriving at the dock or port, the captured image data may be either transferred via a wired or wireless network servicing the dock or port, or by extracting a physical storage device from the imaging vehicle and inserting the physical storage device into a computing device configured to store captured image data. In other embodiments, to reduce the storage requirements at the imaging vehicle, the imaging vehicle may transmit the image data to a centralized location as the imaging vehicle captures the image data. In any case, the image data captured by the imaging vehicle is stored at an image database (such as the image database 534 of FIG. 5) interconnected to the server.

The server may then obtain the stored image from the image database (block 604). In one example, the server may be configured to automatically detect when new image data is added to the image database. In response, the server may be configured to obtain and process the newly added image data. In another example, a user may execute a command that causes the server to obtain and process image data within the image database.

The server may then analyze and/or convert the obtained image data to generate a virtual model of the overall region and/or the various features thereof (block 606). To this end, the server may input the image data and the corresponding embedded metadata to a model generation routine (such as the model generation routine 526 of FIG. 5). The model generation routine may apply photogrammetry techniques to identify edges, vertices, or surfaces of areas or structures of interest within the image data to segment the overall region into its various features. For example, the model generation routine 526 may identify features across multiple images. Based on the known location and angle from which each image was captured, the model generation routine 526 can utilize triangulation calculations to estimate three dimensional shapes of the feature. The model generation routine 526 may then correlate each feature to physical coordinates and/or an address at which each feature is located in the overall region. To generate a model, the model generation routine 526 may analyze the image data to determine the dimensions of the modeled object and create a template three-dimensional object of the same dimensions. After the template object is generated, the model generation routine 526 may generate a mesh for the object that utilizes the obtained image data. In embodiments in which the virtual model is curated to include integrated annotation objects and data objects, the model generation routine 526 may also generate overlay meshes for the modeled object.

As is known in the art, for various reasons, virtual models are rarely generated without flaws. Sometimes, features will simply not be reconstructed in the virtual model, or reconstructed inaccurately. To this end, in some embodiments, after generating the virtual models, the server may then curate the generated virtual models to remove flaws, increase image quality, emphasize relevant features, deemphasize image data, and/or otherwise prepare the virtual model for user review (block 608). In some embodiments, the curation process may even include removing features that have been reconstructed accurately but that are not relevant to user analysis (e.g., by removing or deemphasizing model features not relevant to assessing the property).

Virtual models may be curated using a variety of techniques. For instance, a particular scale or coordinate system may be modified, boundaries may be smoothed or deleted, gaps between objects may be bridged, parts of the model may be sliced and/or filled, density of meshes may be changed using triangulation, subdivision, and decimation techniques, etc. In some embodiments, a user may curate the virtual models using a graphical user interface associated with the model generation routine 526 at the server, such as by manually selecting features of interest or potential interest (e.g., a user may select within a lower-quality model a portion of a fence that may or may not be damaged for further review or further data collection).

In further embodiments, relevant features or aspects of the model may be identified by the server as being relevant to user analysis of the property based upon curation rules, such as a fence or a roof. In some such embodiments, the server may compare an edge or appearance characteristic depicted in the model with templates data that are defined to model edge or appearance characteristics of relevant features to identify portions of the model that match the templates data in accordance with curation rules. Consequently, the identified portions of the model containing relevant features may be emphasized or presented with greater detail in the curated model, whereas the other unidentified portions of the model may be deemphasized or provided with less detail. In some embodiments, the curation rules may take into account the location of a particular property of interest (e.g., based on location identification information received from user electronic device 180) to improve the image quality for the model as it pertains to the particular property of interest. For instance, the curation rules may compare the location identification information to location metadata embedded in the images used in developing the model, and upon a match, evaluate the image resolution of the matching images. Any images below an image quality threshold may be replaced with higher-resolution images. Still, in some embodiments, the curation rules may link an annotation object with the model, so that upon rendering the model in a virtual model, annotation overlays may be graphically rendered to depict information included in the annotation object. The original model may be separately retained, in order to facilitate review of other features by the user at a later time, should the user request more detailed data regarding other features within the model.

The server may then store the generated virtual models in a model database, such as the model database 536 of FIG. 5 (block 610). The server may organize the virtual model database based on embedded metadata associated with the image data depicted in the virtual models. To this end, the server may determine that embedded location data for an updated virtual model generated based on the image data captured by the imaging vehicle includes the same or similar location information for a pre-existing virtual model already stored in the model database. Accordingly, the server may determine that the newly generated virtual model is an updated version of the currently stored virtual model.

By storing the virtual models in the model database, the server makes available the virtual models for use in rendering a virtual environment (block 612). According to aspects, the user electronic device may transmit a request to view a virtual environment that includes the modeled property of interest. In response, the server may query the model database and access any models that match the request. The server may then generate and provide the virtual environment including a rendered virtual model to the user electronic device. Further, as the virtual models are linked to the annotations database and/or data records database, as the data records and/or annotation records are updated over time, the updates may be automatically propagated into any overlays or informational displays included in the virtual environment.

Figure 7:
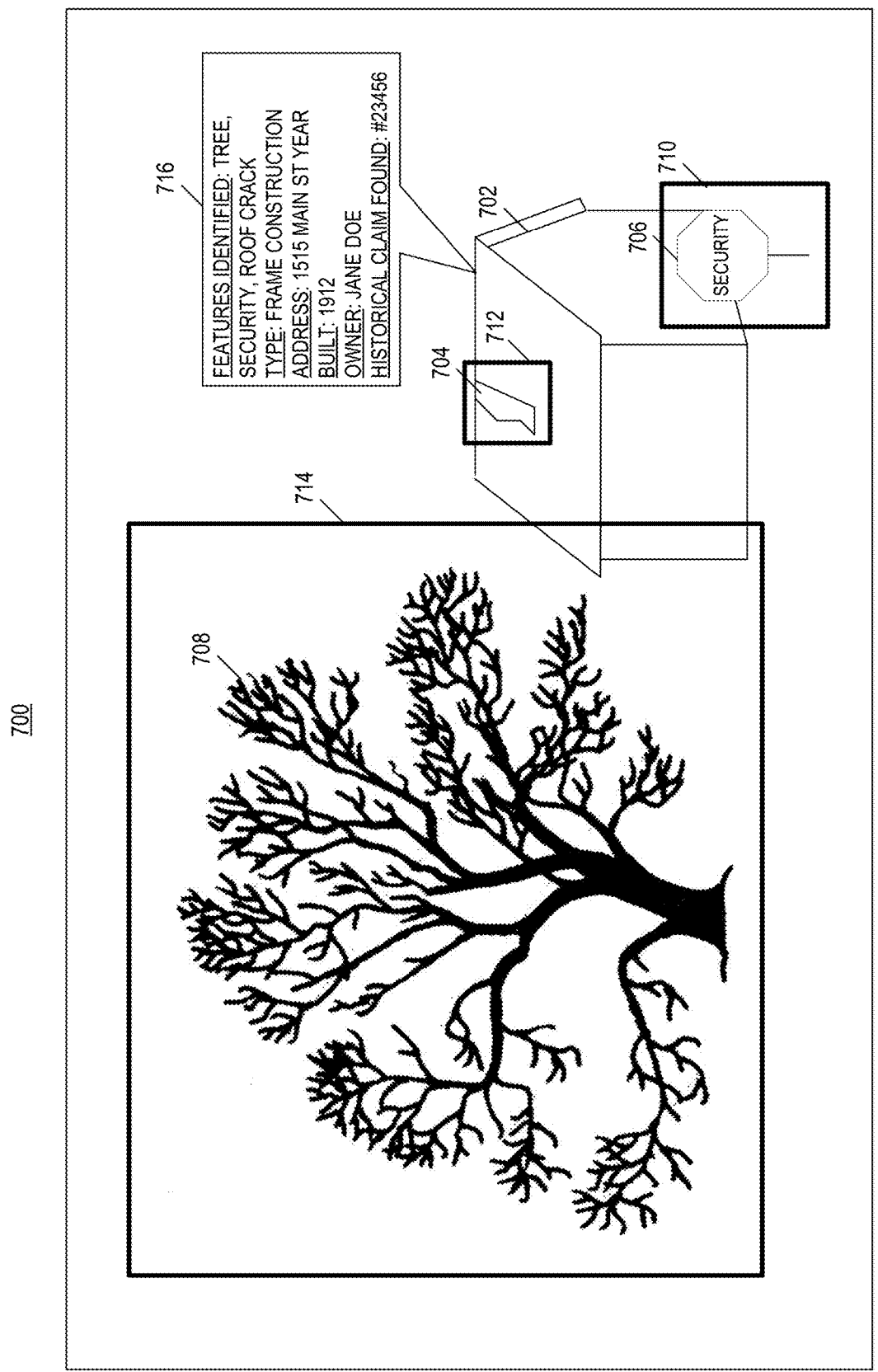
FIG. 7 depicts an exemplary virtual environment that includes virtual models of one or more properties with an overlay rendered therein.

FIG. 7 depicts a virtual environment 700 in which overlays are rendered therein. For instance, a virtual model of a property may, upon render, depict various features of the property, including a structure 702 of a building (e.g., a home), a crack 704 in a roof, a security sign 706 indicating that a security system has been installed, and a leaning tree 708.

As shown, exemplary annotation overlays may be rendered in the virtual environment 700. A property specialist using the virtual environment 700 may desire to emphasize that the security sign 706 feature reduces risk for the property as it is deterring future theft or burglary for the property, whereas the cracked roof 704 and leaning tree 708 features are increasing risk for the property, since the cracked roof 704 and leaning tree 708 may invite further damage to the property. Accordingly, the property specialist may interact (e.g., invoke hand gestures, and/or utilize a control device) with any of the features (e.g., the security sign 706) within the virtual environment 700 to cause an annotation overlay 710 to surround security sign 706 to emphasize the security sign 706. Because the security sign 706 may be a source for reducing the risk of theft or burglary at the property by deterring future theft or burglary at the property, the annotation overlay 710 may be visually distinguished from annotation overlay 712 for example, which may surround the roof crack 704 to emphasize the high level of risk associated with the property. For instance, the annotation overlay 710 may be visually depicted in a green color, and the annotation overlay 712 may be visually depicted in a red color. As another example, annotation overlay 714 may surround the leaning tree 708 in a similar way as annotation overlay 712 to emphasize that the leaning tree 708 may be a source of a high level of risk associated with the property.

In some embodiments, a user may interact with the virtual environment 700 to cause data records overlays to be rendered within the virtual environment. For example, data records overlays may include records information such as the age, an address, a market value, a name of business, a name of owner, agent affiliation, zoning information, or historical claims data associated with the one or more properties. As shown, exemplary data records overlay 716 may be rendered in the virtual environment. Data records overlay 716 may indicate various information concerning the modeled property, such as type of frame construction, address, year built, and/or identified features of the property. In some aspects, a server (such as the server 520 of FIG. 5) may have linked a data record to the virtual model. The data records overlay 716 may therefore include records information included in the data record associated with the property, such as any public records or proprietary records found for the property.

It should be noted that while FIG. 7 illustrates the virtual model of a residential home, other virtual models may be representative of other types of property (e.g., residential building, neighborhood, or other suitable region surrounding a property).

Additional Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed is:

1. A computer-implemented method comprising:
receiving, by one or more processors, a data request from a user electronic device, wherein the data request comprises at least one or more properties of interest located at a particular portion of an overall region;
dynamically acquiring, by the one or more processors and based on the data request, a virtual model for rendering the one or more properties of interest within a virtual environment at the user electronic device, the virtual model generated based upon a plurality of images;
determining, by the one or more processors, curated assessment data indicating one or more features that contributes to assessing risks associated with the one or more properties of interest;
obtaining, by the one or more processors and based at least in part on the curated assessment data, one or more annotation records corresponding to an annotation object associated with the one or more features that contributes to assessing risks from a database;
determining, by the one or more processors and based at least in part on the curated assessment data, curation rules, wherein the curation rules, when executed by the one or more processors, cause the one or more processors to:
define templates data to include images depicting items relevant to assessing risk for the one or more properties of interest; and
identify, based on the templates data, a subset of the plurality of images that depicts at least one of the features or objects for inclusion in a curated virtual model, wherein identifying the subset of the plurality of images comprises at least one of:
determining that an edge of the features or objects depicted in the plurality of images matches the edge in the templates data; or
determining that an appearance of the features or objects depicted in the plurality of images matches the appearance in the templates data; and
modifying, by the one or more processors and based at least in part on the curation rules, the virtual model to generate the curated virtual model, the curated virtual model visually emphasizing the one or more features in accordance with the curation rules, and including an annotations overlay rendered in the virtual environment with information included in the one or more annotation records.

2. The computer-implemented method of claim 1, wherein the curation rules cause the one or more processors to:
receive location identification information for the one or more properties of interest;
compare the location identification information to location metadata included in the plurality of images;
upon identifying a portion of the plurality of images that includes the location metadata that matches the location identification information, evaluate an image resolution of the portion of the plurality of images to determine whether the image resolution meets a predetermined image resolution threshold; and
replace one or more images of the portion of the plurality of images with higher-resolution image data of the one or more properties of interest if the image resolution does not meet the predetermined image resolution threshold.

3. The computer-implemented method of claim 1, wherein the curation rules cause the one or more processors to:
associate at least one of the annotation object or a data object with the one or more features associated with the one or more properties of interest that are relevant to assessing risks associated with the one or more properties of interest in the curated virtual model.

4. The computer-implemented method of claim 3, further comprising:
obtaining, by the one or more processors, one or more data records associated with the data object from the database; and
populating, by the one or more processors, a data records overlay rendered in the virtual environment with records information included in the one or more data records,
wherein the records information comprises at least one of an age, an address, a market value, a name of business, a name of owner, agent affiliation, zoning information, or historical claims data associated with the one or more properties of interest.

5. The computer-implemented method of claim 4, further comprising:
transmitting, to the user electronic device, the virtual environment, wherein the user electronic device comprises at least one of a first virtual reality device or a first mixed-reality device.

6. The computer-implemented method of claim 5, wherein the curation rules cause the one or more processors to:
receive, from the first virtual reality device or the first mixed-reality device, a user selection of the one or more features in the virtual environment; and
generate the annotations overlay corresponding to the user selection of the one or more features to depict information included in the annotation object.

7. The computer-implemented method of claim 6, further comprising:
transmitting, to at least a second virtual reality device or a second mixed-reality device, the virtual environment and the annotations overlay on the virtual environment.

8. The computer-implemented method of claim 1, wherein the one or more features comprise at least one of: a type of structure of the one or more properties of interest, a route of egress, or an external element located outside of or along an exterior of the one or more properties of interest.

9. The computer-implemented method of claim 1, wherein generating the curated virtual model to include the annotations overlay comprises:
populating a first annotations overlay associated with a first feature rendered in a first depiction characteristic; and
populating a second annotations overlay associated with a second feature rendered in a second depiction characteristic.

10. A system comprising:
one or more processors;
one or more transceivers operatively connected to the one or more processors and configured to send and receive communications over one or more communication networks; and
one or more non-transitory memories coupled to the one or more processors and storing computer-executable instructions, that, when executed by the one or more processors, cause the system to:

receive a data request from a user electronic device, wherein the data request comprises at least one or more properties of interest located at a particular portion of an overall region;

dynamically acquire, based on the data request, a virtual model for rendering the one or more properties of interest within a virtual environment at the user electronic device, the virtual model generated based upon a plurality of images;

determine curated assessment data indicating one or more features that contributes to assessing risks associated with the one or more properties of interest;

obtain, based at least in part on the curated assessment data, one or more annotation records corresponding to an annotation object associated with the one or more features that contributes to assessing risks from a database;

determine, based at least in part on the curated assessment data, curation rules, wherein the curation rules, when executed by the one or more processors, cause the system to:

define templates data to include images depicting features or objects relevant to assessing risk for the one or more properties of interest;

identify, based on the templates data, a subset of the plurality of images that depicts at least one of the features or objects for inclusion in a curated virtual model;

define the templates data to further include templates of model edge or appearance characteristics of features or objects relevant to assessing risk for the one or more properties of interest; and compare an edge or appearance characteristics depicted in the virtual model with the templates data to identify a portion of the virtual model that matches the templates data for visual emphasis in the curated virtual model; and modify, based at least in part on the curation rules, the virtual model to generate the curated virtual model, the curated virtual model visually emphasizing the one or more features in accordance with the curation rules, and including an annotations overlay rendered in the virtual environment with information included in the one or more annotation records.

11. The system of claim 10, wherein the curation rules are configured to further cause the system to:

receive location identification information for the one or more properties of interest;

compare the location identification information to location metadata included in the plurality of images;

upon identifying a portion of the plurality of images that includes the location metadata that matches the location identification information, evaluate an image resolution of the portion of the plurality of images to determine whether the image resolution meets a predetermined image resolution threshold; and replace one or more images of the portion of the plurality of images with higher-resolution image data of the one or more properties of interest if the image resolution does not meet the predetermined image resolution threshold.

12. The system of claim 10, wherein the curation rules are configured to further cause the system to:

associate at least one of the annotation object or a data object with the one or more features associated with the one or more properties of interest that are relevant to assessing risks associated with the one or more properties of interest in the curated virtual model.

13. The system of claim 12, wherein the computer-executable instructions, when executed by the one or more processors, further cause the system to:

obtain one or more data records associated with the data object from the database; and populate a data records overlay rendered in the virtual environment with records information included in the one or more data records, wherein the records information comprises at least one of an age, an address, a market value, a name of business, a name of owner, agent affiliation, zoning information, or historical claims data associated with the one or more properties of interest.

14. The system of claim 13, wherein the computer-executable instructions, when executed by the one or more processors, further cause the system to:

transmit, to the user electronic device, the virtual environment, wherein the user electronic device comprises at least one of a first virtual reality device or a first mixed-reality device.

15. The system of claim 14, wherein the curation rules are configured to further cause the system to:

receive, from the first virtual reality device or the first mixed-reality device, a user selection of the one or more features in the virtual environment; and generate the annotations overlay corresponding to the user selection of the one or more features to depict information included in the annotation object.

16. The system of claim 15, wherein the computer-executable instructions, when executed by the one or more processors, further cause the system to:

transmit, to at least a second virtual reality device or a second mixed-reality device, the virtual environment and the annotations overlay on the virtual environment.

17. A non-transitory, tangible computer-readable medium storing machine readable instructions that, when executed by a processor, cause the processor to:

receive a data request from a user electronic device, wherein the data request comprises at least one or more properties of interest located at a particular portion of an overall region;

dynamically acquire, based on the data request, a virtual model for rendering the one or more properties of interest within a virtual environment at the user electronic device, the virtual model generated based upon a plurality of images;

determine curated assessment data indicating one or more features that contributes to assessing risks associated with the one or more properties of interest;

obtain, based at least in part on the curated assessment data, one or more annotation records corresponding to an annotation object associated with the one or more features that contributes to assessing risks from a database;

determine, based at least in part on the curated assessment data, curation rules, wherein the curation rules, when executed by the processor, cause the processor to:

define templates data to include images depicting features or objects relevant to assessing risk for the one or more properties of interest; and identify, based on the templates data, a subset of the plurality of images that depicts at least one of the features or objects for inclusion in a curated virtual model, wherein identifying the subset of the plurality of images comprises at least one of:
- determining that an edge of the features or objects depicted in the plurality of images matches the edge in the templates data; or
- determining that an appearance of the features or objects depicted in the plurality of images matches the appearance in the templates data; and modify, based at least in part on the curation rules, the virtual model to generate the curated virtual model, the curated virtual model visually emphasizing the one or more features in accordance with the curation rules, and including an annotations overlay rendered in the virtual environment with information included in the one or more annotation records.

* * * * *